(12) United States Patent
Nguyen et al.

(10) Patent No.: US 6,334,746 B1
(45) Date of Patent: Jan. 1, 2002

(54) TRANSPORT SYSTEM FOR A POWER GENERATION UNIT

(75) Inventors: Tho Vankhanh Nguyen, Houston; Robert Allen Baten, Baytown, both of TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/540,206

(22) Filed: Mar. 31, 2000

(51) Int. Cl.$^7$ .................................................. B60P 7/08
(52) U.S. Cl. ............................ 410/44; 410/46; 410/87; 410/156
(58) Field of Search .............................. 410/44, 46, 35, 410/77, 87, 156; 290/1 A, 1 R, 2; 307/64, 68, 70

(56) References Cited

U.S. PATENT DOCUMENTS

| | | | | |
|---|---|---|---|---|
| 2,828,931 A | * | 4/1958 | Harvey | 410/46 |
| 3,194,525 A | * | 7/1965 | Webb | 410/46 |
| 3,208,699 A | * | 9/1965 | Hutchins et al. | 410/46 |
| 3,272,151 A | * | 9/1966 | Newell | 410/87 X |
| 3,758,058 A | * | 9/1973 | Neudeck et al. | 410/46 |
| 4,469,954 A | | 9/1984 | Maehara | |
| 6,210,088 B1 | * | 4/2001 | Crosby | 410/35 |

FOREIGN PATENT DOCUMENTS

GB   1563934   3/1980

* cited by examiner

*Primary Examiner*—Stephen T. Gordon
(74) *Attorney, Agent, or Firm*—Nixon & Vanderhye

(57) ABSTRACT

A trailer mounts a turbine and a generator for transport to a power generation site. The mount for the turbine includes a sub-base mounted for pivotal movement adjacent a rear end thereof proximate the forward end of the generator. The forward end of the sub-base is secured to the trailer by an isolator mount. The two mounts constitute a 3-point mounting system for the sub-base and turbine carried thereby whereby during transport, the sub-base and turbine are enabled for limited angular deflection of the turbine axis relative to the generator rotor axis. The pivotal mounting adjacent the interconnection between the turbine and generator rotors lies along discrete opposite sides of the trailer. Torque is transmitted from the turbine to the generator base through the pivotal mountings. At the power generation site, the sub-base is locked down and minimal adjustment is required to align the turbine and generator rotors.

16 Claims, 6 Drawing Sheets

TRANSPORT SYSTEM FOR A POWER GENERATION UNIT

BACKGROUND OF THE INVENTION

The present invention relates to a mobile power generating unit and particularly relates to a system for mounting a turbine and an electromotive machine, with their rotor axes in substantial alignment with one another, on a trailer for over-the-road transport whereby alignment adjustments at the power generating site are minimized.

Mobile power generating units are well known and typically comprise a turbine and an electromotive machine such as a generator or alternator (herein referred to interchangeably as a generator) mounted either on separate trailers or a single trailer for transport to a power generating site. Typically, the turbine and generator are mounted on different trailers. At the site, the turbine and generator are coupled to one another to form the power generating unit. It will be appreciated that these units are large-scale, heavy and require accurate alignment in use in order to safely and efficiently generate power. This often necessitates deployment of heavy-duty equipment to manipulate one or both of the machines into alignment at the site and, as a result, requires substantial investment in time and labor. Not infrequently, a full week may be required to properly align and adjust the machines for operation. In those power generation units mounting the turbine and generator on a single trailer, the rotors of the turbine and generator are typically connected together by a flexible coupling. While the turbine and generator are in initial alignment prior to transport, it is very difficult to maintain alignment during travel and also to correct for misalignment at start-up, i.e., difficult to realign. This is in part due to the manner of mounting the turbine and generator on the trailering system.

Additionally, with the turbine and generator mounted directly on a single trailer and generating power at the site, torque from the turbine is transmitted directly to the trailer. Because the trailer is not constructed to accommodate torque, the power generating system gradually and unpredictably goes out of alignment.

Accordingly, there has arisen a need for a power generating unit of substantial size and power generating capacity having a capability for over-road transport of the turbine and generator on a single trailer with the drive line initially aligned and enabling angular deflection during transport with minimal alignment adjustments at start-up and reduced capacity for misalignment during operation.

BRIEF SUMMARY OF THE INVENTION

In accordance with a preferred embodiment of the present invention, there is provided a single trailer for transporting an initially aligned turbine and electromotive machine such as a generator or alternator (hereafter referred to as a generator) over-road to a power generation site whereby the system can be readily aligned at the site and maintained in alignment during operation. To accomplish this, the generator is fixed to the trailer. Preferably, the base of the generator is welded to the frame of the trailer, fixing the component parts of the machine, both stationary and rotational components, in exact position. The turbine, however, is fixed to a sub-base. The sub-base, in turn, is pivotally mounted at one end to the generator base, preferably by a pair of transversely spaced clevis mounts. The opposite end of the sub-base is mounted to an isolator fixed to the trailer frame along the centerline of the trailer. This 3-point mounting, i.e., the isolator and the pair of clevis mounts, enable angular deflection of the axis of the turbine relative to the axis of the rotor of the generator during transport. The isolator is, of course, locked down to maintain alignment of the turbine and generator axes during power generation at the site. Preferably, the sub-base is mounted at an end adjacent the generator by the pair of clevis-type pivotal mounts spaced transversely one from the other as widely as possible along opposite sides of the trailer whereby the sub-base is pivotal at its aft end about those pivotal mounts. Because the isolator during transport permits limited vertical angular movement of the end of the turbine opposite the generator, the turbine rotor axis may angularly deflect relative to the generator axis upon over-road pivoting movement of the sub-base and turbine relative to the trailer and the generator. The pivotal mounts are also located at a like longitudinal location along the trailer as a flexible coupling between the turbine and generator rotors. This enables the turbine and generator axes to be maintained in approximate alignment with one another, notwithstanding angular deflection of the sub-base carrying the turbine about the transverse axis of the clevis-type mounts. Additionally, only a very slight lateral deflection of the sub-base mounting the turbine is permitted because of the pinned clevis-type connection between the sub-base and the base of the generator. The springs in the isolator maintain the end of the sub-base opposite the generator base in a central position limiting vertical and lateral deflections.

Not only is the initial alignment maintained during transport, minimizing the requirement for substantial alignment at the power generation site, but the foregoing described 3-point mounting also enables the torque of the turbine to be transferred directly from the turbine sub-base into the generator base rather than directly to the trailer. With this 3-point mounting, torque from the turbine is transferred through the pivot pins directly to the generator base. Preferably, the pivot mounts for the sub-base are located as wide apart as possible, given over-road transport requirements. This is significant because if the torque was transferred directly to the trailer, the turbine and generator axes would gradually and unpredictably move out of alignment. The trailer is not designed to absorb the torque of the turbine and, hence, in accordance with the present invention, the torque is transferred directly from the turbine to the generator base rather than directly to the trailer underlying the turbine.

In a preferred embodiment according to the present invention, there is provided a system for transporting a power generation unit comprising an elongated trailer mounted on a plurality of wheels on axles spaced from one another along the length of the trailer, an electromotive machine having a rotor rotatable about an axis and disposed on the trailer, the machine being secured to the trailer and being located with the rotor axis extending in a length direction of the trailer, a sub-base, a turbine having a rotor rotatable about an axis and fixed to the sub-base, the turbine and the electromotive machine being mounted on the sub-base and the trailer, respectively, with the rotor axes thereof in substantial axial alignment relative to one another, the sub-base adjacent an end thereof proximate the electromotive machine being connected to the trailer for pivotal movement about a transverse axis normal to the length direction of the trailer and a mounting between the trailer and the sub-base adjacent an opposite end of the sub-base remote from the electromotive machine limiting joint pivotal movement of the sub-base and an opposite end of the turbine from the electromotive machine about the transverse axis in a generally vertical direction whereby the axes of the rotors are maintained in approximate axial alignment relative to one another during transport of the power generation unit on the trailer.

DETAILED DESCRIPTION OF THE INVENTION

Figure 1:
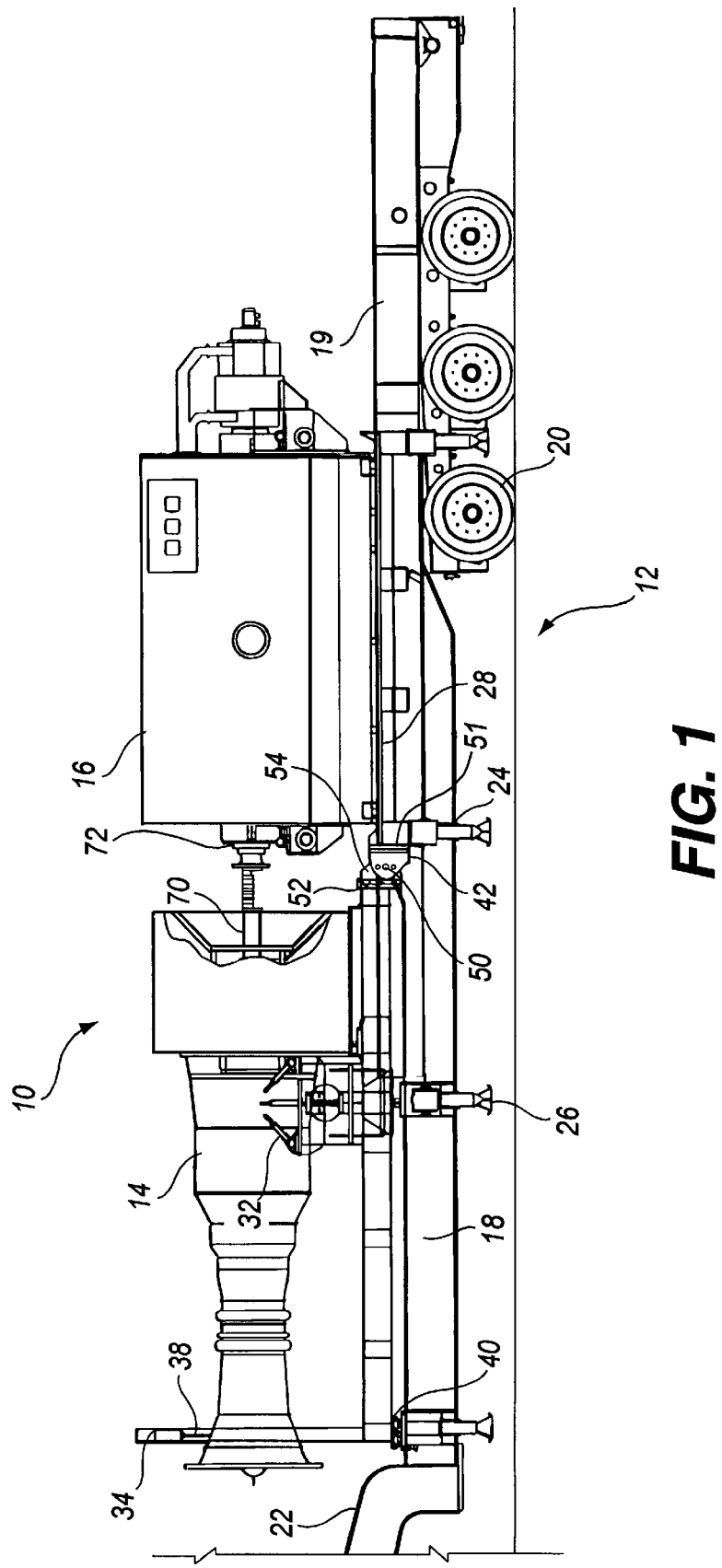
FIG. 1 is a side elevational view of a turbine and a generator mounted on a trailer configured for over-road transport in accordance with the present invention.
Figure 2:
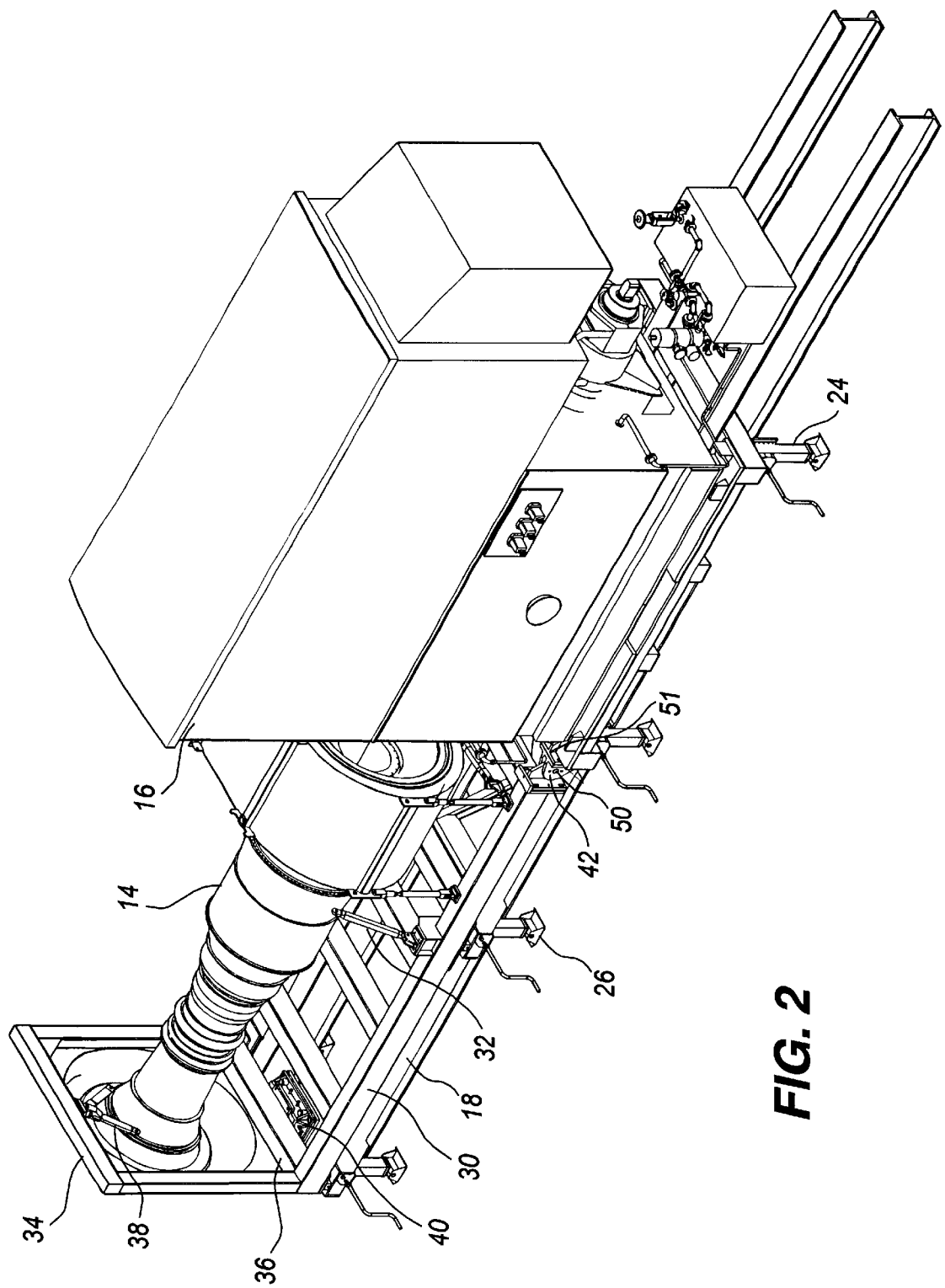
FIG. 2 is a perspective view of the power generation unit of FIG. 1 in a power generating mode on-site.
Figure 3:
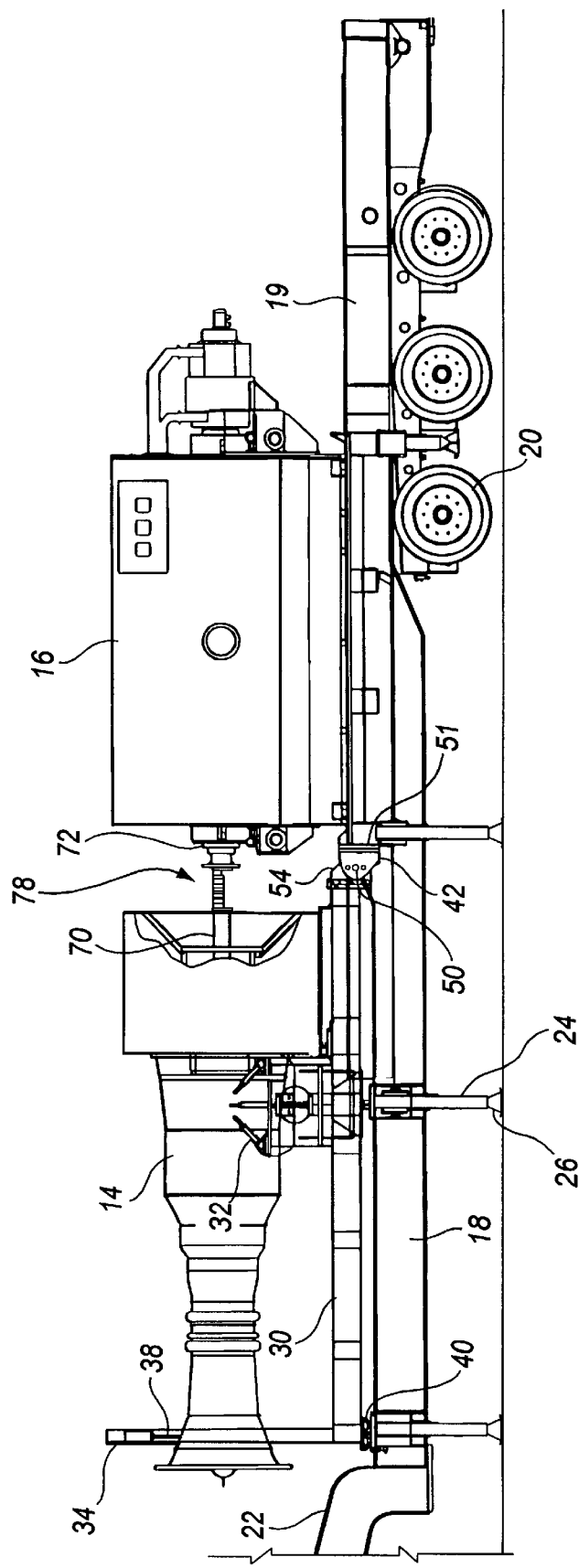
FIG. 3 is a side elevational view thereof.

Referring now to the drawings, particularly to FIG. 1, there is illustrated a power generation system, generally designated 10, mounted on a trailer, generally designated 12. The power generation system includes a turbine, e.g., a gas turbine 14, and an electromotive machine 16, e.g., a generator or alternator, both mounted on the trailer 12. As illustrated, the trailer is elongated and has a pair of forward elongated support beams 18 and a pair of rear elongated support beams 19, preferably welded to one another with the forward beams 18 at an elevation below the rear beams 19 for reasons which will become apparent. At the rear end of the trailer wheels 20 are mounted on three longitudinally spaced axles in a tandem alignment, preferably with air suspension. The forward end of the trailer is pinned to a removable trailer gooseneck 22 which, while not shown, is pivoted at its forward end to a trailer having multiple wheels and axles to which a tractor is pivotally secured. Mounted along opposite sides of the trailer at longitudinally spaced positions therealong are a plurality of independent landing legs 24, preferably eight, with lower support and leveling plates 26. The legs 24 can be lowered to support and stabilize the trailer as well as to elevate the wheels 20 from the ground as illustrated in FIG. 3.

The generator is mounted directly on a base 28 (FIG. 1) which, in turn, is fixed to the rear beams 19 of the trailer 12. Preferably, the base 28 of the generator 16 is welded to the rear beams 19, rigidly fixing the generator to the trailer.

The turbine 14 is mounted on a sub-base 30 comprised of a structural framework. Various tie-downs 32 secure the turbine to the sub-base 30 at longitudinally spaced positions along the length of the turbine. The forward end of the turbine 14 is disposed in a shroud 34 having a central opening 36, the shroud 34 being carried by sub-base 30. Adjustable clevis-type mounts 38 interconnect the shroud 34 and the forward end of the turbine for supporting the turbine at its forward end.

Figure 5:
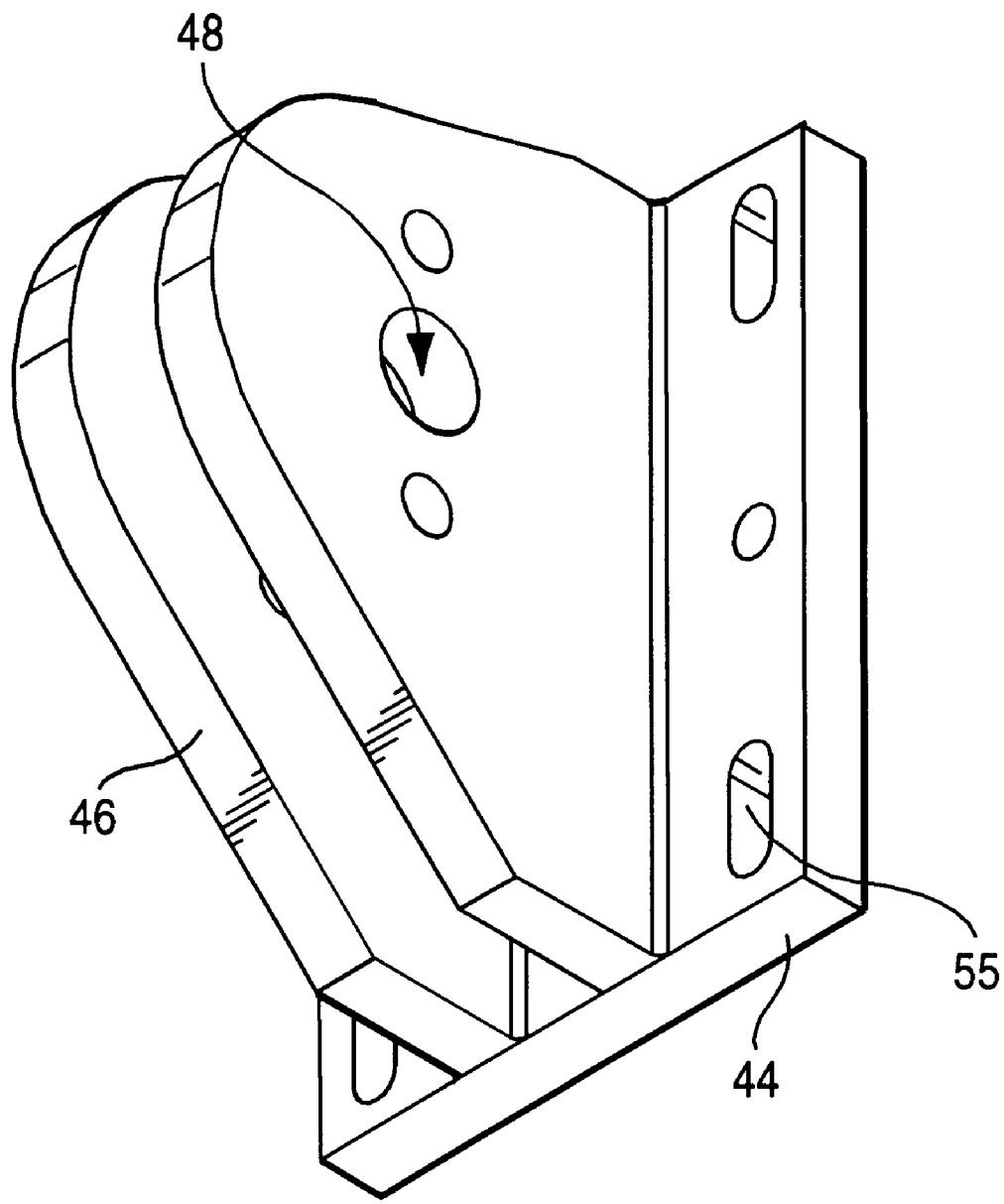
FIG. 5 is a perspective view of a clevis forming a part of one of the two pivotal mountings of the sub-base for the turbine to the generator base.

In accordance with the present invention, the sub-base 30 is mounted to the trailer at three locations, i.e., a 3-point mount. Two pivotal connections 42 at the rear or aft end of the sub-base 30 pivotally mount the sub-base 30 to the base 28 of the generator which, in turn, is secured to the trailer. Alternatively, the rear end of the sub-base may be pivotally connected directly to the trailer. An isolator mount 40 secures the forward end of the sub-base 30 to the trailer along the centerline of the trailer. With reference to FIGS. 1 and 5, the two pivotal connections 42 joining the sub-base 30 to the base 28 of the generator preferably comprise clevis-type connections. For example, as illustrated in FIG. 5, the clevis-type connection 42 may comprise a base plate 44 and a pair of longitudinally projecting plates 46 spaced from one another and having openings 48 to receive pivot pins 50 (FIG. 1). The generator base 28 mounts a mating base plate 51 to which plate 44 is vertically adjustably secured. The rear end of sub-base 30 includes a base plate 52 having a rearwardly projecting support plate 54 for reception between the plates 46. The plate 54 also includes an opening for receiving the pin 50 whereby the rear end of the sub-base 30 is pivotally coupled to the base 28 of generator 16 and, hence, to the trailer. The base plates 44 of the devises have vertically elongated openings 55 (FIG. 5) for securing the plates 44 to the base plates 51 of the generator base 28 at adjusted vertical positions to facilitate initial alignment of the rotor axes of the turbine 14 and generator 16.

Figure 4:
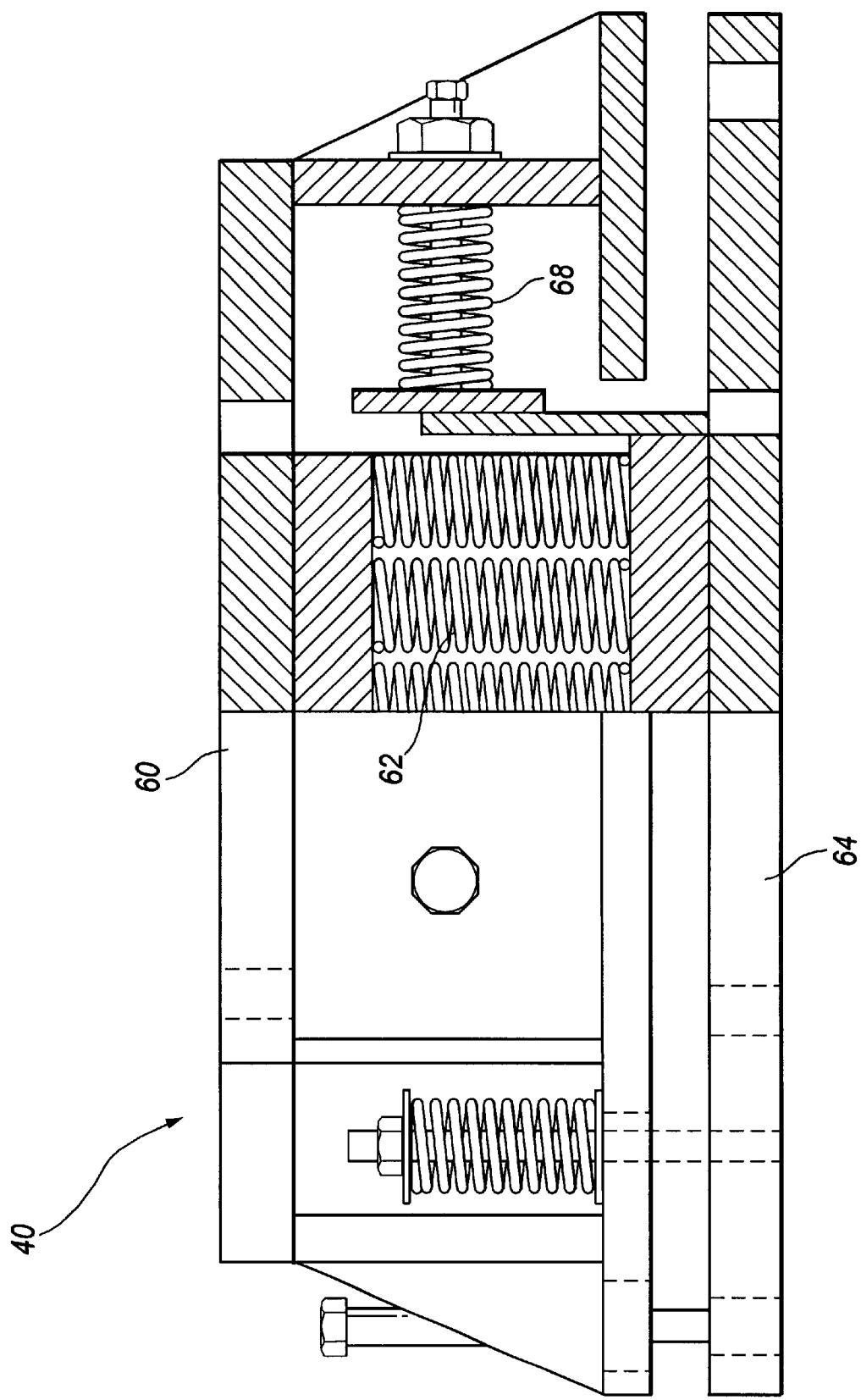
FIG. 4 is a combined elevational and cross-sectional view of an isolator mounting for the forward end of the sub-base of the turbine.

At the forward end of the sub-base 30, the isolator mount 40 enables, during transport, limited displacement of the forward end of the sub-base 30 in a vertical direction, i.e., the sub-base pivots about the pivot pins 50, necessarily requiring vertical movement of the forward end of the sub-base 30. The isolator mount 40 is a commercially available mount having a movable support plate 60 secured to the sub-base 30 enabling movement of plate 60 in a limited vertical direction and biased for return to a neutral position by a plurality of springs 62. The movable plate 60 is secured to the forward end of the sub-base 30 and hence the forward end of the turbine follows the movement of the plate 60. Also, referring to FIG. 4, the base 64 of the isolator mount 40 is secured to the forward end of the trailer, e.g., the forward beams 18, by suitable bolts, not shown, along a central longitudinal axis of the trailer bisecting the pivotal mounts 42. The movable support plate 60 mounted on springs 62 thus moves vertically a limited distance under the bias of springs 62 relative to the base plate 64. It will be appreciated that the movable plate 60 may be fixed in a vertically adjusted position to base plate 64 by suitable bolts when the power generation unit is set up to generate power at the site. Additionally, lateral movement of the support plate 60 relative to the base plate 64 is facilitated by springs 68. Thus, to a very limited extent, the forward end of the sub-base 30 may be laterally displaced. It will be appreciated that during transport, the support plate 60 enables limited vertical and lateral movement of the forward end of the sub-base and that during start-up and power generating operations at the site, the isolator mount is locked down to the trailer, fixing the forward end of the sub-base 30 and hence turbine against either vertical or lateral movement. The lock-down is accomplished by bolting the movable plate 60 and the base plate 64 to one another such that the movable plate 64 cannot move, either vertically or laterally.

Figure 6:
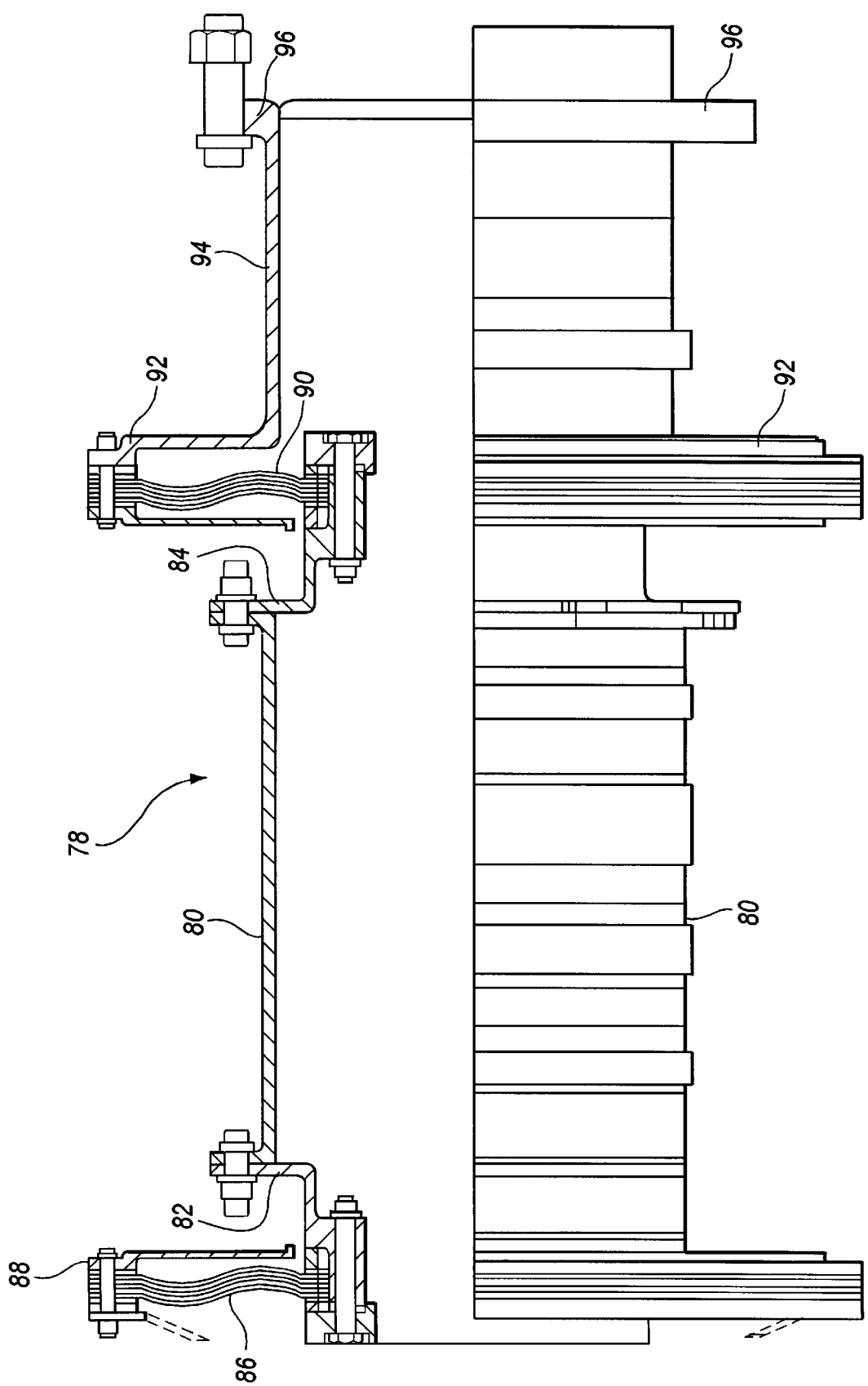
FIG. 6 is a partial side elevational and cross-sectional view of a flexible coupling between the rotors of the turbine and the machine.

During transport and operation, a flexible-type, commercially available coupling 78 (FIG. 6) is provided between the turbine rotor 70 and the generator rotor 72. The coupling 78 is available from Ameridrives International, Erie, Pa., and is identified as a Size # S22-G, Series: HH Ameriflex Coupling. Briefly, the coupling 78 includes a central sleeve 80 secured at opposite ends to flanges 82 and 84. Flange 82 is secured to the interior diameter of a plurality of metal laminations 86. The metal laminations 86 are secured at their outer diameter to a flange 88 which, in turn, is secured to the turbine rotor 70. Similarly, at the opposite end of the coupling, the flange 84 is secured to the inner diameter of metal laminations 90. The outer diameters of the laminations 90 are secured to a flange 92 forming part of a sleeve 94, the opposite end of which has a flange 96 for securement to the generator rotor 72. With this coupling, it will be appreciated that the axis of the turbine rotor may be angularly deflected relative to the axis of the generator rotor to a limited extent permitted by the laminations 86 and 90.

In using the transport system hereof, the electromotive machine 16 is secured to the trailer 12 at a fabrication site. Particularly, the base 28 of the generator 16 is fixed, preferably by welding, to the support beams 19 of the trailer. The sub-base 30 is then pinned to the base 28 of the machine 16 by the clevis-type connections 42 and pins 50. The forward end of the sub-base 30 is also secured to the movable support plate 60 of the isolator mount 40 previously secured to the forward end of the trailer to the beams 18. With the turbine mounted on the sub-base, alignment of the axis of the turbine rotor 70 and machine rotor 72 is accomplished using standardized procedures. Note that the sub-base 30 may be adjusted vertically and shimmed laterally to align the rotor axes. The flexible coupling 78 may be applied to interconnect the rotors prior to transport or may be secured to the rotors at the power generation site subsequent to transport and during installation.

With the turbine and machine 16 mounted on the trailer as previously described, the trailer is transported to the power generating site. It will be appreciated that during such transportation, the trailer and, hence, turbine 14 and machine 16 are subjected to various road conditions which tend to misalign the axes of the rotors. For example, the trailer may sag and flex somewhat under the weight of the unit and the suspension systems may not be sufficient to avoid vibrating the turbine and machine tending to relatively displace the turbine and generator. The 3-point mounting of the sub-base 30 on which the turbine is mounted, however, maintains the rotor axes in substantial alignment throughout the transport and at the installation site. While the forward end of the turbine may be displaced vertically against the bias of the springs of the isolation mount 40 which is unlocked during transport (hence, the sub-base 30 pivots about the pins 50), the general alignment of the rotor axes is maintained. Consequently, only minimal adjustment of the turbine relative to the generator is necessary at the installation site. Moreover, upon start-up with the isolator mount locked down and during power generation, the torque generated by the turbine and transmitted to the sub-base 30 is, in turn, transmitted directly to the base of the generator 16 through the pinned connection. This avoids transfer of torque directly to the forward portion of the trailer and avoids applying stresses to the trailer which the trailer is not designed to accommodate. Because the isolator mount 40 is located along the centerline of the trailer, torque cannot be transmitted from forward end of the sub-base 30 to the trailer. By avoiding transmission of torque to the forward part of the trailer, the tendency of the turbine and generator to become misaligned during power generation is entirely avoided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for transporting a power generation unit comprising:

an elongated trailer mounted on a plurality of wheels on axles spaced from one another along the length of the trailer;

an electromotive machine having a rotor rotatable about an axis and disposed on said trailer, said machine being secured to the trailer and being located with the rotor axis extending in a length direction of the trailer;

a sub-base;

a turbine having a rotor rotatable about an axis and fixed to said sub-base;

the turbine and the electromotive machine being mounted on said sub-base and said trailer, respectively, with the rotor axes thereof in substantial axial alignment relative to one another;

said sub-base adjacent an end thereof proximate said electromotive machine being connected to said trailer for pivotal movement about a transverse axis normal to said length direction of the trailer; and a mounting between said trailer and said sub-base adjacent an opposite end of said sub-base remote from said electromotive machine limiting joint pivotal movement of said sub-base and an opposite end of said turbine from said electromotive machine about the transverse axis in a generally vertical direction whereby the axes of said rotors are maintained in approximate axial alignment relative to one another daring transport of the power generation unit on the trailer.

2. A system according to claim 1 wherein the pivotal connection between said sub-base and said trailer and said mounting between said trailer and said opposite end of said sub-base constitute the sole structural support for said turbine and sub-base from said trailer during transport.

3. A system according to claim 1 wherein said mounting includes means for biasing the opposite end of said turbine for returning the turbine to a position wherein the rotor axes are in substantial alignment relative to one another in response to pivotal movement of said turbine about said transverse axis in a direction misaligning the rotor axes.

4. A system according to claim 1 wherein said mounting between said trailer and said sub-base adjacent said opposite end of said sub-base lies along a longitudinal centerline of said trailer.

5. A system according to claim 1 wherein said pivotal connection between said sub-base and said trailer comprises a pair of discrete pivotal mountings along respective opposite sides of said trailer.

6. A system according to claim 1 wherein said mounting between said trailer and said sub-base adjacent said opposite end of said sub-base lies along a longitudinal centerline of said trailer, said pivotal connection between said sub-base and said trailer comprising a pair of discrete pivotal connections along respective opposite sides of said trailer.

7. A system according to claim 6 wherein said mounting along the longitudinal centerline of said trailer and said pair of pivotal connections comprise the sole structural support for said turbine and said sub-base from said trailer during transport.

8. A system according to claim 6 wherein said trailer includes a plurality of independent landing legs for supporting said trailer.

9. A system for transporting a power generation unit comprising:

an elongated trailer mounted on a plurality of wheels on axles spaced from one another along the length of said trailer;

an electromotive machine having a rotor rotatable about an axis and disposed on said trailer, said machine having a base secured to the trailer and being located with the rotor axis extending in a length direction of the trailer;

a sub-base;

a turbine having a rotor rotatable about an axis and fixed to said sub-base;

the turbine and the electromotive machine being mounted on said sub-base and said trailer, respectively, with the rotor axes thereof in substantial axial alignment relative to one another;

said sub-base adjacent an end thereof proximate said electromotive machine being connected to said base of said electromotive machine for pivotal movement about a transverse axis normal to said length direction of the trailer; and a mounting between said trailer and said sub-base adjacent an opposite end of said sub-base remote from said electromotive machine limiting joint pivotal movement of said sub-base and an opposite end of said turbine from said electromotive machine about the transverse axis in a generally vertical direction whereby the axes of said rotors are maintained in approximate axial alignment relative to one another during transport of the power generation unit on the trailer.

10. A system according to claim 9 wherein the pivotal connection between said sub-base and said base and said mounting between said trailer and said opposite end of said sub-base constitute the sole structural support for said turbine and sub-base from said trailer during transport.

11. A system according to claim 9 wherein said mounting includes means for biasing the opposite end of said turbine for returning the turbine to a position wherein the rotor axes are in substantial alignment relative to one another in response to pivotal movement of said turbine about said transverse axis in a direction misaligning the rotor axes.

12. A system according to claim 9 wherein said mounting between said trailer and said sub-base adjacent said opposite end of said sub-base lies along a longitudinal centerline of said trailer.

13. A system according to claim 9 wherein said pivotal connection between said sub-base and said base comprises a pair of discrete pivotal mountings along respective opposite sides of said trailer.

14. A system according to claim 9 wherein said mounting between said trailer and said sub-base adjacent said opposite end of said sub-base lies along a longitudinal centerline of said trailer, said pivotal connection between said sub-base and said base comprising a pair of discrete pivotal connections along respective opposite sides of said trailer.

15. A system according to claim 14 wherein said mounting along the longitudinal centerline of said trailer and said pair of pivotal connections comprise the sole structural support for said turbine and said sub-base from said trailer during transport.

16. A system according to claim 14 wherein said trailer includes a plurality of independent landing legs for supporting said trailer.

* * * * *

UNITED STATES PATENT AND TRADEMARK OFFICE
CERTIFICATE OF CORRECTION

| | | |
|---|---|---|
| PATENT NO. | : 6,334,746 B1 | Page 1 of 1 |
| DATED | : January 1, 2002 | |
| INVENTOR(S) | : Nguyen et al. | |

It is certified that error appears in the above-identified patent and that said Letters Patent is hereby corrected as shown below:

<u>Column 4,</u>
Line 17, delete "devises" and insert -- clevises --.

<u>Column 6,</u>
Line 26, delete "daring" and insert -- during --.

Signed and Sealed this

Twenty-third Day of April, 2002

Attest:

*Attesting Officer*

JAMES E. ROGAN
*Director of the United States Patent and Trademark Office*